RE 17,698

June 10, 1930. J. S. WEARN Re. 17,698

BELT DRIVEN POWER TRANSMISSION APPLIANCE

Original Filed Aug. 29, 1921

INVENTOR.
James Stuart Wearn
BY Albert H. Austin
ATTORNEY

Reissued June 10, 1930

Re. 17,698

UNITED STATES PATENT OFFICE

JAMES STUART WEARN, OF CHRISTCHURCH, NEW ZEALAND, ASSIGNOR TO WEARNS AUTOMATIC DRIVE COMPANY, LIMITED, OF CHRISTCHURCH, NEW ZEALAND, A CORPORATION OF NEW ZEALAND

BELT-DRIVEN POWER-TRANSMISSION APPLIANCE

Original No. 1,526,650, dated February 17, 1925, Serial No. 496,517, filed August 29, 1921. Application for reissue filed December 31, 1926. Serial No. 158,351.

This invention relates to belt driven appliances for use in transmitting motive power to machinery of all classes, but the means devised have been specially designed for use with cream separators and like classes of machines. The object of the invention is to provide improved simple and convenient means by the employment of which the driving speed is made co-relative with the correct operating speed of the machine to be driven, and by means of which also the driving belt is automatically tensioned so as to prevent slipping on the pulley. The invention also provides for the absorption of all driving shocks so that such shocks shall not reach the machine.

The invention consists in a special construction of apparatus of the known class of power transmission appliances in which a driving shaft is carried in a frame that is mounted to rotate on a driven shaft, the two shafts being disposed in parallel lines, and in which a driving pinion is mounted on the driving shaft to mesh with a gear wheel mounted on the driven shaft, and a pulley is fitted upon the driving shaft and receives rotation from a driving belt encircling it.

Thus in the rotation of the spindle through its belt drive, the pinion thereon will tend to make an epicyclic movement around the gear wheel with which it meshes, but such movement will be restrained by the belt when the belt has been tensioned, and the continued rotation of the pinion will rotate the gear wheel and operate the machine. The degree of tension placed upon the driving belt will depend upon the inertia to be overcome in starting the machine from rest and in the continued running thereof, so that the belt will be properly tensioned to afford the necessary driving power under all circumstances.

The construction designed provides for a special form of frame for carrying the driving shaft and its parts so that a compact arrangement of the parts is obtained, and also embodies special means whereby a braking action may be transmitted to the driving belt when a certain maximum epicyclic movement of the driving pinion has taken place so as to prevent any possibility of overstraining the driving belt, or of injuring the driving motor by an excessive overload.

The said construction is illustrated in the accompanying drawings, in which:—

Figure 1:
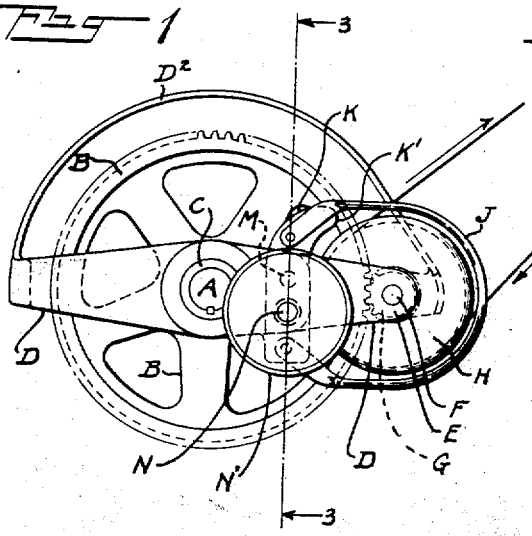
Figure 1 is a side elevation.
Figure 3:
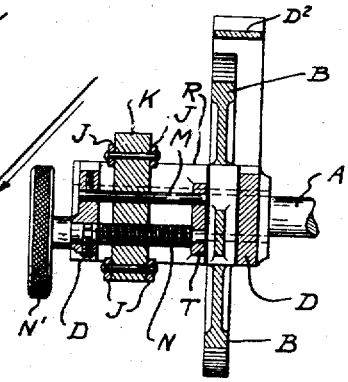
Figure 3 is a cross sectional elevation on the line 3—3 of Figure 1, and looking to the left of such line.
Figure 2:
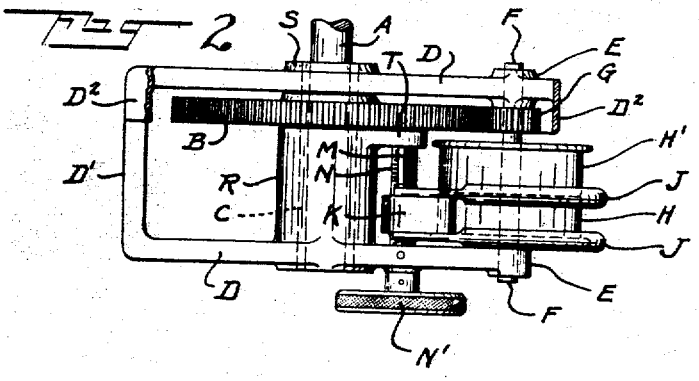
Figure 2 is a plan thereof.

A is the machine shaft and B the main gear wheel fixed thereto. This latter is made of external tooth type, and is preferably fixed on a sleeve or bushing C that is keyed or otherwise fastened to the shaft.

A frame formed by two side arms or brackets D is provided to swing upon the sleeve C, the two arms being arranged in parallel lines at a distance apart to extend on opposite sides of the gear wheel and to accommodate between them the driving spindle and its pulleys and driving pinion.

The frame in the construction shown includes hubs R and S extending from the two side arms respectively toward the gear wheel B and provided with internal bearing surfaces loosely supported by sleeve C aforementioned. If desired sleeve C may be omitted in which case gear wheel B may be attached directly to shaft A and hubs R and S may bear directly on the shaft.

The arms D are extended out at both ends beyond the circumference of the wheel B and may be joined together at their rear ends by a cross bar D′. At their forward ends the arms are made with journals E in which the corresponding ends of the driving spindle F are mounted so as to rotate freely therein. On this spindle the driving pinion G is fixed in a position such as to engage the main wheel B. Also upon it are mounted the fast pulley H and loose pulley H′.

The frame carrying the spindle may thus swing freely upon the axis formed by the mounting of the frame upon the shaft A so that the pinion G will perform an epicyclic movement upon the gear wheel should the spindle be rotated on its own axis. Consequently when rotation is imparted to the spindle through the driving power of a belt encircling the fast pulley H, the pinion will Cross Reference perform this movement within the limits afforded by the belt's tension. When this tension is strained to the necessary extent to overcome the inertia of the machine being driven, the epicyclic movement of the pinion will cease and its rotation upon its own axis continuing, the gear wheel will have the desired rotation imparted to it. It will thus be evident that the strain on the belt will be increased or eased as greater or less power is required to drive the machine, and when once the machine is running and has attained momentum, any variations in the driving power will cause the pinion to creep round upon the gear wheel in one direction or the other, so that any jars or shocks caused by such variations will be absorbed and thereby eliminate any transmission of them to the machine. This is a desirable feature in the driving of centrifugal cream separators, for which this gearing is particularly designed. Also, at the same time any slackening of the driving belt away from its work will be prevented so that easy uniform motion is transmitted to the machine.

The construction shown embodies means for controlling the driving belt to cause it to engage either the fast or loose pulley at will. These means consist in a pair of guides J each shaped to encircle the outer portion of the periphery of such pulleys and having its two ends fixed respectively to the upper and lower ends of a block K arranged to extend vertically inside the pulley. The guides are fastened respectively to the opposite faces of this block and are positioned apart the necessary distance to permit of the driving belt passing between them as it approaches and leaves the pulley. The block is held in position by being mounted on the transversely extending rods M—N that are arranged in the frame D.

Hub R extends from one arm D to a point adjacent gear wheel B and is provided at the latter end with an extension T for supporting rods M and N. Rod M is rigidly supported by arm D and extension T and rod N is journalled in said arm and extension to permit rotational movement thereof.

The upper rod M passes loosely through the block K, while the lower rod N is screw-threaded and passes through a female threaded bore in the block K and is mounted in the frame so as to permit of its rotation but to be held from longitudinal movement. This lower rod has a small hand wheel N′ fixed on its outer end by which the rod may be rotated. The rotation of the screw rod will thus cause the block to be moved across between the side members of the frame and to carry the belt guides with it, in a direction corresponding with that of the rod's rotation, the upper rod M acting as a guide for its travel. Therefore by the use of these means the driving belt may be shifted on to either the loose or fast pulley at will.

In order to reduce the possibility of the driving belt working too far around the wheel B in its operation, provision is made for subjecting the belt to a checking or braking action such as will cause it to slip on its main driving pulley and thus stop the movement, when the pinion has travelled round the wheel to a certain maximum extent. This will serve to prevent any liability of the belt being subjected to an undue strain and also to prevent it coming in contact with the appliance.

Such provision consists in forming the belt guide block K with an extension K′ on its end corresponding with the side of the pulley H from which the belt moves away, which extension curves over towards the pulley's periphery in the manner shown in Figure 1, in which also the travel of the belt is indicated. This extension will therefore, as the pinion travels around the pulley and the frame D tips down at that end, approach the belt and will engage and press thereon when the maximum travel is reached, to such a degree as to exert a strong braking action that will hold the belt and cause it to slip on the pulley by which its motion is imparted, until the pressure is eased by the pinion moving back.

The frame D may be provided with a hood or guard $D^2$ extending round over the top of the gear wheel B.

While certain novel features of the invention have been shown and described and have been pointed out in the annexed claims, it will be understood that various omissions, substitutions and changes in the forms and details of the device illustrated and in its operation may be made by those skilled in the art without departing from the spirit of the invention.

I claim:

1. In power transmission means, in combination, a driven shaft, a frame formed by a pair of side arms pivoted upon such shaft and a cross member connecting them together at one end, a driving shaft journaled to extend within the other ends of such side arms, a gear wheel upon the driven shaft, between the side arms and a driving pinion upon the driving shaft arranged in gear with such wheel, a fast, and a loose pulley mounted on the said driving shaft and a driving belt guide carried in the said frame, said pinion and said fast and loose pulleys being also arranged between the side arms.

2. In power transmission means, in combination a driven shaft, a frame mounted to rotate on such driven shaft, a driving shaft journaled in the frame to extend parallel with the driven shaft, a gear wheel upon the driven shaft, a driving pinion upon the driving shaft engaging such gear wheel, a fast and a loose pulley upon the said driving shaft, a driving belt adapted to encircle either of such pulleys, a belt guide mounted to move across the frame parallel with the driving shaft and a brake shoe attached to such guide and formed with an upward extension substantially as specified.

3. In power transmission means, the combination with a driven shaft, a frame mounted to rotate on the driven shaft having a driving shaft journaled therein to extend parallel with the driven shaft, and with engaging gear wheels mounted respectively upon the two shafts, of a driving pulley mounted on the driving shaft, a driving belt encircling such pulley and a brake shoe carried upon the frame and disposed to engage the surface of the said belt when the frame rotates on the driven shaft, substantially as specified.

4. A power transmission device comprising a driven shaft, a gear wheel fixed thereon, a frame comprising a pair of arms mounted on opposite sides of said gear wheel and journaled for rotational movement about said shaft, a driving shaft disposed in a plane parallel to said driven shaft and journaled in said arms, said driving shaft having a pinion fixed thereon meshing with said gear wheel, said arms being extended rearwardly and joined for strengthening the assembly, a shield for said gear wheels supported by said rearwardly extending arms, a pulley on said driving shaft and a belt driving said pulley, said elements being so related that an increased load automatically tends to cause said driving shaft to creep around said driven shaft in such direction as to tighten the belt.

5. A power transmission attachment comprising a sleeve adapted to be attached to a driven shaft, a driven gear wheel rigidly attached to said sleeve, driving shaft disposed parallel to said sleeve and having a pinion meshing with said gear wheel, a frame for carrying said driving shaft loosely mounted on said sleeve for rotation thereabout, a pulley on said driving shaft and a belt driving said pulley in such direction as to cause the load to automatically tighten the belt.

6. In a power device, a driven gear, a driving gear, an arm connecting the centers of said gears whereby said gears are in driving relation and said driving gear may rotate automatically about said driven gear and to an extent proportional to the torque transmitted to said driving gear, means for driving said driving gear and allowing its movement about said driven gear and safety means for limiting the travel of said driving gear about said driven gear to prevent disarrangement of said driving means.

7. In a power transmission device, a driven shaft, having a gear wheel affixed thereto, a driving shaft disposed parallel to said driven shaft and having a pinion thereon, means for transmitting power from said pinion to said gear wheel, means for supporting said driving shaft for rotational movement about said driven shaft, a pulley on said driving shaft, a belt driving said pulley in such direction as to cause a load to tighten the belt and safety means to automatically limit the driving force exercised by such belt to a predetermined value.

8. A power transmission device comprising a driven shaft, having a gear wheel affixed thereto, a driving shaft disposed parallel to said driven shaft and having a pinion meshing with said gear wheel, an arm carrying said driving shaft, a pulley on said driving shaft, a belt driving said pulley, such elements being so related that an increased load tends to automatically tighten the belt, and a brake carried by said arm, said brake being adapted to contact with a portion of said driving mechanism when said arm has been rotated to a given position and to prevent further rotation thereof.

In testimony whereof, I affix my signature.

JAMES STUART WEARN.